United States Patent
Sakamoto

(10) Patent No.: US 9,207,362 B2
(45) Date of Patent: Dec. 8, 2015

(54) COPOLYMER, OPTICALLY ANISOTROPIC SUBSTANCE, AND ORIENTED POLYMER FILM

(71) Applicant: ZEON CORPORATION, Tokyo (JP)

(72) Inventor: Kei Sakamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/434,652

(22) PCT Filed: Oct. 4, 2013

(86) PCT No.: PCT/JP2013/077119
§ 371 (c)(1),
(2) Date: Apr. 9, 2015

(87) PCT Pub. No.: WO2014/057884
PCT Pub. Date: Apr. 17, 2014

(65) Prior Publication Data
US 2015/0232625 A1      Aug. 20, 2015

(30) Foreign Application Priority Data

Oct. 10, 2012  (JP) ................................ 2012-225148

(51) Int. Cl.

| | |
|---|---|
| *G02B 1/08* | (2006.01) |
| *C08J 5/18* | (2006.01) |
| *C08G 63/06* | (2006.01) |
| *C08G 64/12* | (2006.01) |
| *C08L 67/04* | (2006.01) |
| *C08L 69/00* | (2006.01) |
| *B29C 55/02* | (2006.01) |
| *G02B 1/04* | (2006.01) |
| *G02B 5/30* | (2006.01) |
| *B29C 55/00* | (2006.01) |

(52) U.S. Cl.
CPC ................ *G02B 1/08* (2013.01); *B29C 55/005* (2013.01); *B29C 55/02* (2013.01); *C08G 63/065* (2013.01); *C08G 64/12* (2013.01); *C08J 5/18* (2013.01); *C08L 67/04* (2013.01); *C08L 69/00* (2013.01); *G02B 1/045* (2013.01); *G02B 5/30* (2013.01); *Y10T 428/31507* (2015.04); *Y10T 428/31786* (2015.04)

(58) Field of Classification Search
CPC ......... C08J 5/18; C08G 63/065; C08G 64/12; C08L 67/04; C08L 69/00; Y10T 428/31507; Y10T 428/31786; C29C 55/005; C29C 55/02; G02B 1/045; G02B 1/08; G02B 5/30
See application file for complete search history.

(56) References Cited

U.S. PATENT DOCUMENTS

| | | |
|---|---|---|
| 5,506,331 A | 4/1996 | Nagao et al. |
| 5,561,017 A | 10/1996 | Nagao et al. |
| 6,565,974 B1 | 5/2003 | Uchiyama et al. |
| 2002/0159005 A1 | 10/2002 | Arakawa et al. |

FOREIGN PATENT DOCUMENTS

| | | | |
|---|---|---|---|
| JP | 06-263707 | * | 3/1993 |
| JP | 6-234840 A | | 8/1994 |
| JP | 10-68816 A | | 3/1998 |
| JP | 10-90521 A | | 4/1998 |
| JP | 11-52131 A | | 2/1999 |
| JP | 11-263832 A | | 9/1999 |
| JP | 11-269137 A | | 10/1999 |
| JP | 2001-4837 A | | 1/2001 |
| WO | WO 00/26705 A1 | | 5/2000 |

OTHER PUBLICATIONS

International Search Report, mailed Dec. 17, 2013, issued in PCT/JP2013/077119.

* cited by examiner

*Primary Examiner* — Robert Jones, Jr.

(74) *Attorney, Agent, or Firm* — Birch, Stewart, Kolasch & Birch, LLP

(57) ABSTRACT

The present invention relates to: a copolymer comprising repeating units (I) and (II) in its molecule, wherein the content of the repeating units (I) and (II) are 5 to 90 mol % and 95 to 10 mol %, respectively, and a 0.5 g/dl methylene chloride solution of the copolymer having a reduced viscosity (ηsp/c) at 20° C. of 0.3 to 2.0 dl/g; an optically anisotropic article comprising one type or two or more types of the copolymer, or a mixture that includes one type or two or more types of the copolymer, and an additional polymer; and an oriented polymer film obtained by stretching the film-like optically anisotropic article.

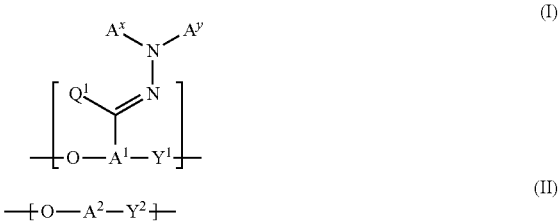

5 Claims, No Drawings

COPOLYMER, OPTICALLY ANISOTROPIC SUBSTANCE, AND ORIENTED POLYMER FILM

TECHNICAL FIELD

The present invention relates to a copolymer and an optically anisotropic article that can produce an optical film that achieves uniform conversion of polarized light over a wide wavelength band, and can be reduced in thickness, as well as an oriented polymer film that is obtained by stretching a film-like optically anisotropic article.

BACKGROUND ART

A flat panel display (FPD) that utilizes an optical film (e.g., polarizer and retardation film) can achieve high-resolution display, and has been widely used as an advantageous display device.

Examples of the retardation film include a quarter-wave plate that converts linearly polarized light into circularly polarized light, a half-wave plate that converts the plane of vibration of linearly polarized light by 90°, and the like. These retardation films can achieve accurate conversion of specific monochromatic light so that ¼λ or ½λ retardation occurs.

However, known retardation films have a problem in that polarized light that passes through is converted into colored polarized light. Specifically, since a material that forms the retardation film has wavelength dispersion with respect to retardation, and a polarization state distribution corresponding to each wavelength occurs with respect to white light that includes different light beams in the visible region, it is impossible to achieve accurate ¼λ or ½λ retardation over the entire wavelength band.

In order to solve the above problem, various wideband retardation films that can achieve uniform retardation with respect to light over a wide wavelength band (i.e., retardation films having reverse wavelength dispersion) have been studied (see Patent Documents 1 to 6, for example).

It has been desired to reduce the thickness of the flat panel display as much as possible along with an improvement in performance and widespread use of mobile information terminals (e.g., mobile personal computer and mobile phone). Therefore, a reduction in thickness of the retardation film has also been desired.

RELATED-ART DOCUMENT

Patent Document

Patent Document 1: JP-A-10-68816
Patent Document 2: JP-A-10-90521
Patent Document 3: JP-A-11-52131
Patent Document 4: JP-A-2000-284126 (US20020159005A1)
Patent Document 5: JP-A-2001-4837
Patent Document 6: WO2000/026705

SUMMARY OF THE INVENTION

Technical Problem

The invention was conceived in view of the above situation. An object of the invention is to provide a copolymer and an optically anisotropic article that can produce an optical film that achieves uniform conversion of polarized light over a wide wavelength band, and can be reduced in thickness, as well as an oriented polymer film that is obtained by stretching a film-like optically anisotropic article.

Solution to Problem

The inventor of the invention conducted extensive studies in order to solve the above problem. As a result, the inventor found that an optically anisotropic article that achieves uniform conversion of polarized light over a wide wavelength band, and can be reduced in thickness, can be obtained by utilizing a copolymer that includes a repeating unit (I) represented by the following formula (I) and a repeating unit (II) represented by the following formula (II) in its molecule, the content of the repeating unit (I) and the content of the repeating unit (II) in the copolymer being within specific ranges, and a 0.5 g/dl methylene chloride solution of the copolymer having a reduced viscosity ($\eta sp/c$) at 20° C. within a specific range. This finding has led to the completion of the invention.

Several aspects of the invention provide the following copolymer (see (1) and (2)), optically anisotropic article (see (3) and (4)), and oriented polymer film (see (5)).

(1) A copolymer including a repeating unit (I) represented by the following formula (I) and a repeating unit (II) represented by the following formula (II) in its molecule, the content of the repeating unit (I) in the copolymer being 5 to 90 mol % based on the total repeating units, the content of the repeating unit (II) in the copolymer being 10 to 95 mol % based on the total repeating units, and a 0.5 g/dl methylene chloride solution of the copolymer having a reduced viscosity ($\eta sp/c$) at 20° C. of 0.3 to 2.0 dl/g,

(I)

wherein $Y^1$ is a chemical single bond, —C(=O)—, or —O—C(=O)—, $A^1$ is a substituted or unsubstituted trivalent aromatic group, $A^x$ is an organic group having 2 to 30 carbon atoms that includes at least one aromatic ring selected from the group consisting of an aromatic hydrocarbon ring and a heteroaromatic ring, $A^y$ is a hydrogen atom, a substituted or unsubstituted alkyl group having 1 to 6 carbon atoms, or an organic group having 2 to 30 carbon atoms that includes at least one aromatic ring selected from the group consisting of an aromatic hydrocarbon ring and a heteroaromatic ring, provided that the aromatic ring included in $A^x$ and the aromatic ring optionally included in $A^y$ are either substituted or unsubstituted, and $A^x$ and $A^y$ are optionally bonded to each other to form a ring, and $Q^1$ is a hydrogen atom, or a substituted or unsubstituted alkyl group having 1 to 6 carbon atoms,

(II)

wherein $Y^2$ is a chemical single bond, —C(=O)—, or —O—C(=O)—, and $A^2$ is a substituted or unsubstituted naphthalenediyl group, or a group represented by the following formula (III),

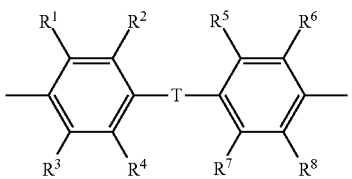
(III)

wherein R¹ to R⁸ are independently a hydrogen atom, a halogen atom, or a hydrocarbon group having 1 to 6 carbon atoms, and T is a group among groups respectively represented by the following formulas (T-1) to (T-3),

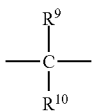
(T-1)

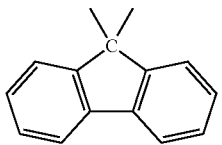
(T-2)

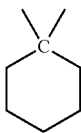
(T-3)

wherein $R^9$ and $R^{10}$ are independently a hydrogen atom, an alkyl group having 1 to 6 carbon atoms, a haloalkyl group having 1 to 6 carbon atoms, or a substituted or unsubstituted aryl group having 6 to 20 carbon atoms.

(2) The copolymer according to (1), wherein $A^1$ included in the repeating unit (I) is a trivalent benzene ring group or a trivalent naphthalene ring group.

(3) An optically anisotropic article including one type or two or more types of the copolymer according to (1) or (2), or a mixture that includes one type or two or more types of the copolymer according to (1) or (2), and an additional polymer.

(4) The optically anisotropic article according to (3), the optically anisotropic article being a film-like optically anisotropic article.

(5) An oriented polymer film obtained by stretching the film-like optically anisotropic article according to (4).

Advantageous Effects of the Invention

The aspects of the invention thus provide a copolymer and an optically anisotropic article that can produce an optical film that achieves uniform conversion of polarized light over a wide wavelength band, and can be reduced in thickness, as well as an oriented polymer film that is obtained by stretching a film-like optically anisotropic article.

DESCRIPTION OF EMBODIMENTS

A copolymer, an optically anisotropic article, and an oriented polymer film according to several exemplary embodiments of the invention are described in detail below.

1) Copolymer

A copolymer according to one embodiment of the invention includes a repeating unit (I) represented by the following formula (I) and a repeating unit (II) represented by the following formula (II) in its molecule, the content of the repeating unit (I) in the copolymer being 5 to 90 mol % based on the total repeating units, the content of the repeating unit (II) in the copolymer being 10 to 95 mol % based on the total repeating units, and a 0.5 g/dl methylene chloride solution of the copolymer having a reduced viscosity (ηsp/c) at 20° C. of 0.3 to 2.0 dl/g.

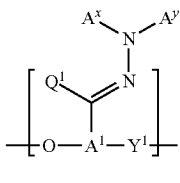
(I)

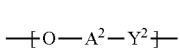
(II)

The copolymer according to one embodiment of the invention includes the repeating unit (I) represented by the formula (I) and the repeating unit (II) represented by the formula (II) in its molecule.

Repeating Unit (I)

$Y^1$ in the formula (I) is a chemical single bond, —C(=O)—, or —O—C(=O)—. It is preferable that $Y^1$ be *—O—C(=O)— (* is a bond to $A^1$) from the viewpoint of availability (or ease of production), and an improvement in the advantageous effects of the invention.

$A^1$ is a substituted or unsubstituted trivalent aromatic group. The trivalent aromatic group may be a trivalent carbocyclic aromatic group, or may be a trivalent heterocyclic aromatic group. It is preferable that the trivalent aromatic group be a trivalent carbocyclic aromatic group, more preferably a trivalent benzene ring group or a trivalent naphthalene ring group, and still more preferably a trivalent benzene ring group or a trivalent naphthalene ring group represented by the following formulas, in order to more advantageously achieve the intended effects of the invention.

Note that the substituent $Y^1$ and 0 are also drawn in the following formulas so that the bonding state can be more easily understood ($Y^1$ is the same as defined above (hereinafter the same)). "—" in the following formulas is a bond from the aromatic ring (hereinafter the same).

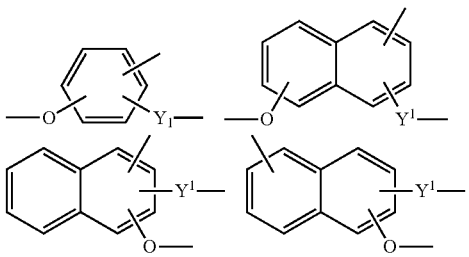

$A^1$ is more preferably a group among groups respectively represented by the following formulas (A11) to (A25), still more preferably a group among the groups respectively represented by the formulas (A11), (A13), (A15), (A19), and (A23), and particularly preferably the group represented by the formula (A11) or the group represented by the formula (A23).

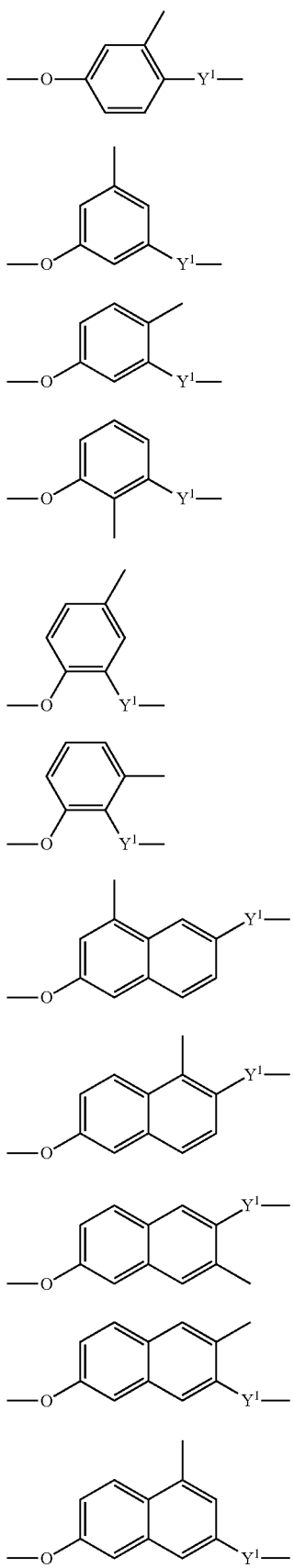

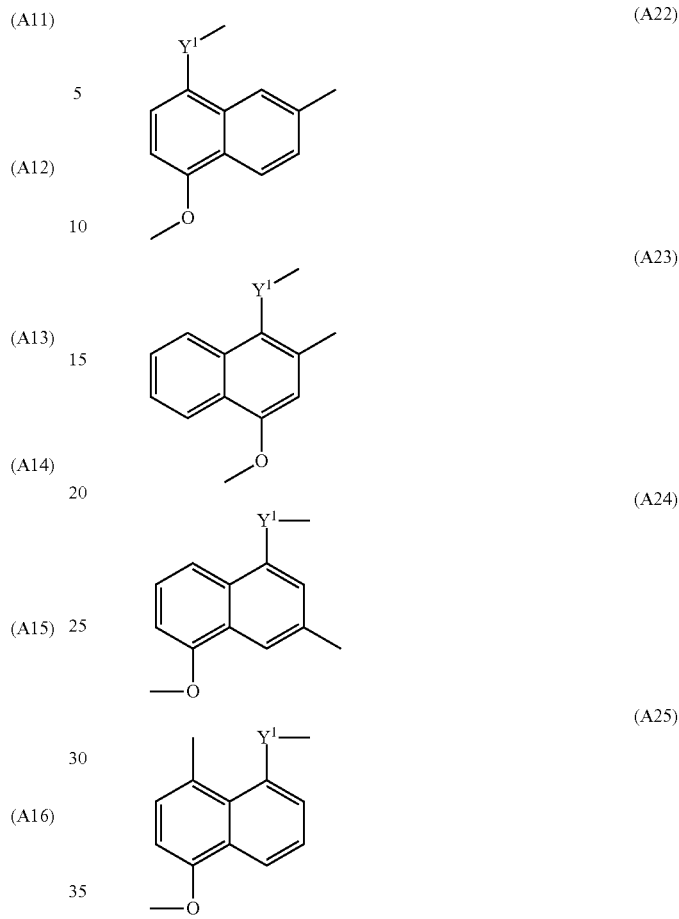

The trivalent aromatic group represented by $A^1$ may be substituted with a substituent at an arbitrary position, but is preferably unsubstituted.

Examples of the substituent that may substitute the trivalent aromatic group represented by $A^1$ include a halogen atom such as a fluorine atom and a chlorine atom; a cyano group; an alkyl group having 1 to 6 carbon atoms, such as a methyl group, an ethyl group, and a propyl group; an alkenyl group having 2 to 6 carbon atoms, such as a vinyl group and an allyl group; a haloalkyl group having 1 to 6 carbon atoms, such as a trifluoromethyl group; a substituted amino group such as a dimethylamino group; an alkoxy group having 1 to 6 carbon atoms, such as a methoxy group, an ethoxy group, and an isopropoxy group; a nitro group; a substituted or unsubstituted aryl group such as a phenyl group, a 4-methylphenyl group, a 2-chlorophenyl group, a 1-naphthyl group, and a 2-naphthyl group; —C(=O)—$R^{16}$; —C(=O)—O$R^{16}$; —SO$_2 R^{16}$; and the like.

$R^{16}$ is an alkyl group having 1 to 6 carbon atoms (e.g., methyl group, ethyl group, or propyl group), or an aryl group having 6 to 14 carbon atoms (e.g., phenyl group, 1-naphthyl group, or 2-naphthyl group).

$A^x$ is an organic group having 2 to 30 carbon atoms that includes at least one aromatic ring selected from the group consisting of an aromatic hydrocarbon ring and a heteroaromatic ring.

The term "aromatic ring" used herein refers to a cyclic structure that exhibits aromaticity in a broad sense according to Huckel's rule (i.e., a cyclic conjugated structure that includes (4n+2) π electrons, and a structure that exhibits aromaticity in which lone pairs of hetero atoms (e.g., sulfur, oxygen, or nitrogen) are involved in the π electron system (e.g., thiophene, furan, and benzothiazole)).

The organic group having 2 to 30 carbon atoms represented by $A^x$ that includes at least one aromatic ring selected from the group consisting of an aromatic hydrocarbon ring and a heteroaromatic ring, may include a plurality of aromatic rings, and may include an aromatic hydrocarbon ring and a heteroaromatic ring.

Examples of the aromatic hydrocarbon ring include a benzene ring, a naphthalene ring, an anthracene ring, and the like. Examples of the heteroaromatic ring include a monocyclic heteroaromatic ring such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; a fused heteroaromatic ring such as a benzothiazole ring, a benzoxazole ring, a quinoline ring, a phthalazine ring, a benzimidazole ring, a benzopyrazole ring, a benzofuran ring, and a benzothiophene ring; and the like.

The aromatic ring included in $A^x$ may be substituted with a substituent. Examples of the substituent include those mentioned above in connection with the substituent that may substitute the trivalent aromatic group represented by $A^1$.

The aromatic ring included in $A^x$ may be substituted with a plurality of identical or different substituents, and two adjacent substituents may bond to each other to form a ring. A ring formed by two adjacent substituents may be either a monocyclic ring or a fused polycyclic ring.

Note that the number of carbon atoms (i.e., 2 to 30) of the organic group represented by $A^x$ refers to the total number of carbon atoms of the organic group excluding the number of carbon atoms of a substituent. This also applies to the number of carbon atoms of the organic group represented by $A^y$.

Examples of the organic group having 2 to 30 carbon atoms represented by $A^x$ that includes at least one aromatic ring selected from the group consisting of an aromatic hydrocarbon ring and a heteroaromatic ring include an aromatic hydrocarbon ring group; a heteroaromatic ring group; an alkyl group having 3 to 30 carbon atoms in total that includes at least one aromatic ring selected from the group consisting of an aromatic hydrocarbon ring group and a heteroaromatic ring group; an alkenyl group having 4 to 30 carbon atoms in total that includes at least one aromatic ring selected from the group consisting of an aromatic hydrocarbon ring group and a heteroaromatic ring group; an alkynyl group having 4 to 30 carbon atoms in total that includes at least one aromatic ring selected from the group consisting of an aromatic hydrocarbon ring group and a heteroaromatic ring group; and the like.

Note that the expression "in total" used in connection with the alkyl group having 3 to 30 carbon atoms in total, the alkenyl group having 4 to 30 carbon atoms in total, and the alkynyl group having 4 to 30 carbon atoms in total means that the number of carbon atoms refers to the total number of the carbon atoms included in the aromatic ring and the carbon atoms included in the alkyl group, the alkenyl group, or the alkynyl group, and excludes the number of carbon atoms included in a substituent.

Specific examples of the organic group having 2 to 30 carbon atoms represented by $A^x$ that includes at least one aromatic ring selected from the group consisting of an aromatic hydrocarbon ring and a heteroaromatic ring, are shown below. Note that $A^x$ is not limited to the groups shown below.

(1) Aromatic hydrocarbon ring group

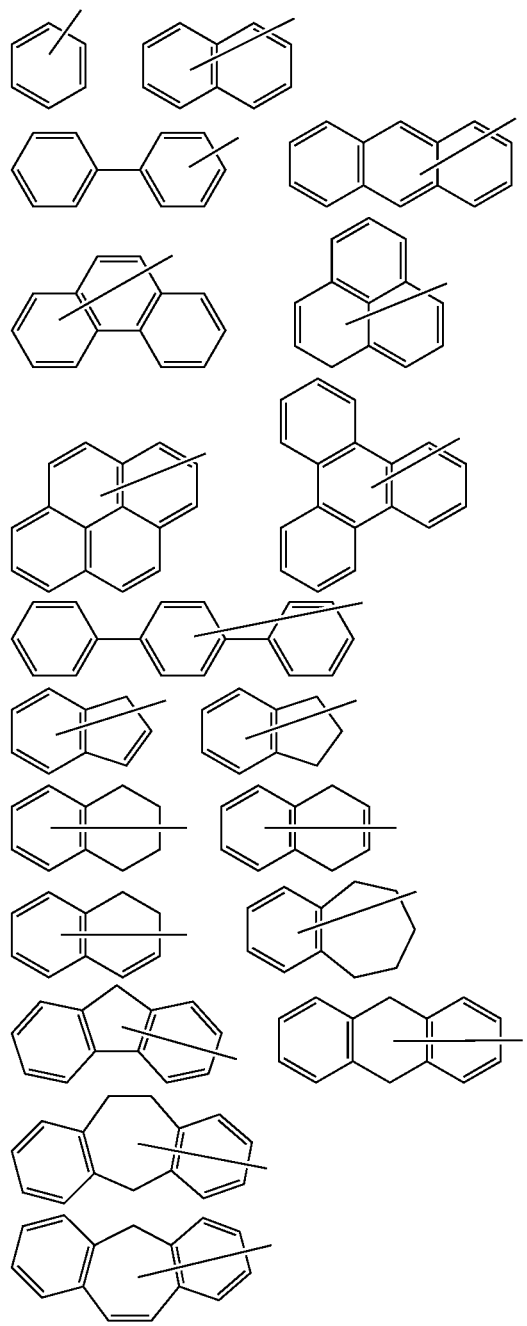

(2) Heteroaromatic ring group

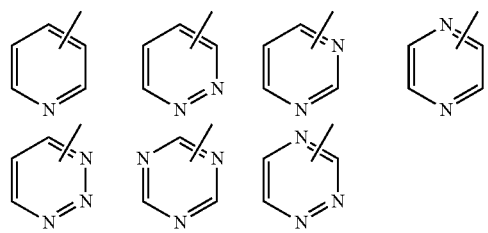

-continued

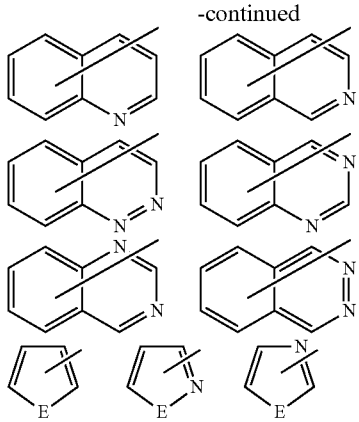

wherein E is $NR^{17}$, an oxygen atom, or a sulfur atom, and $R^{17}$ is a hydrogen atom, or an alkyl group having 1 to 6 carbon atoms (e.g., methyl group, ethyl group, or propyl group).

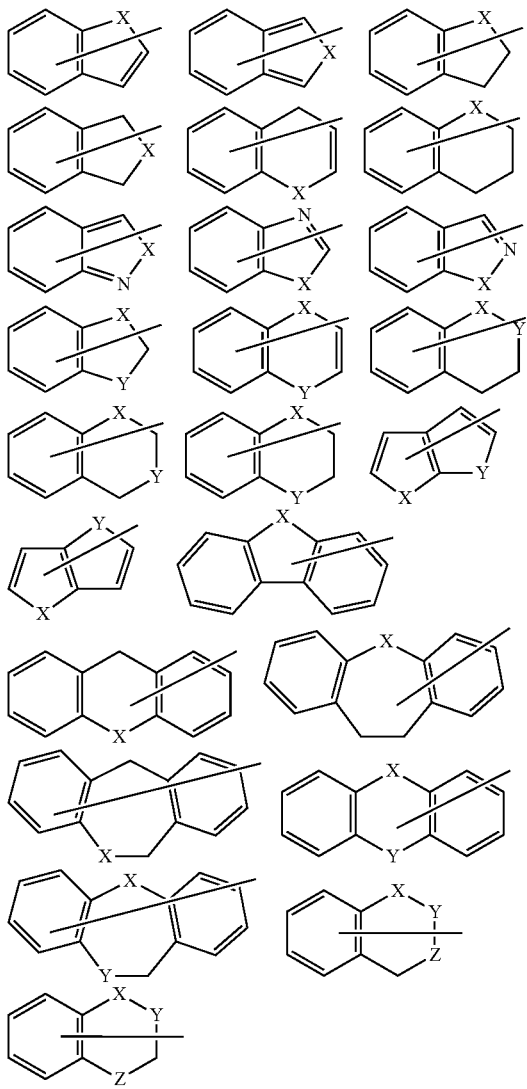

wherein X, Y, and Z are independently $NR^{18}$, an oxygen atom, a sulfur atom, —SO—, or —$SO_2$— (provided that a case where two or more oxygen atoms, sulfur atoms, —SO—, or —$SO_2$— are situated at adjacent positions is excluded), and $R^{18}$ is a hydrogen atom, or an alkyl group having 1 to 6 carbon atoms (e.g., methyl group, ethyl group, or propyl group) similar to that represented by $R^{17}$.

(3) Alkyl group having 3 to 30 carbon atoms in total that includes at least one aromatic ring selected from the group consisting of an aromatic hydrocarbon ring group and a heteroaromatic ring group

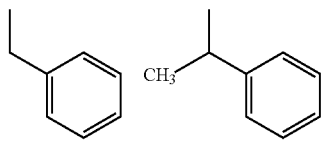

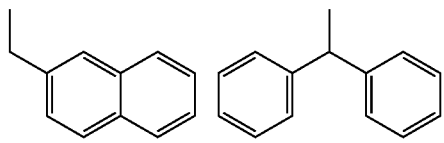

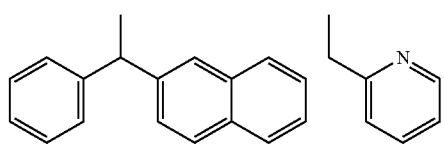

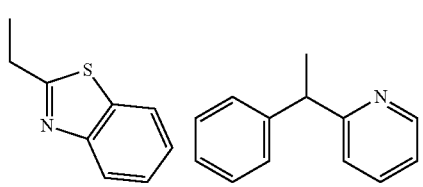

(4) Alkenyl group having 4 to 30 carbon atoms in total that includes at least one aromatic ring selected from the group consisting of an aromatic hydrocarbon ring group and a heteroaromatic ring group

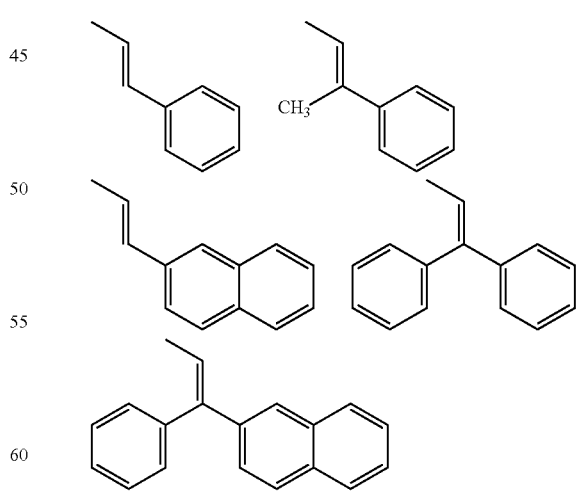

(5) Alkynyl group having 4 to 30 carbon atoms in total that includes at least one aromatic ring selected from the group consisting of an aromatic hydrocarbon ring group and a heteroaromatic ring group

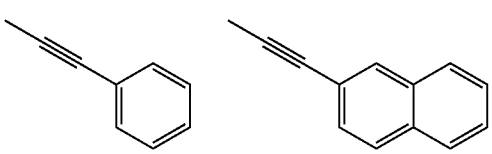

$A^y$ is a hydrogen atom, a substituted or unsubstituted alkyl group having 1 to 6 carbon atoms, or an organic group having 2 to 30 carbon atoms that includes at least one aromatic ring selected from the group consisting of an aromatic hydrocarbon ring and a heteroaromatic ring.

Examples of the alkyl group having 1 to 6 carbon atoms represented by $A^y$ (that is substituted or unsubstituted) include a methyl group, an ethyl group, an n-propyl group, an isopropyl group, an n-butyl group, a sec-butyl group, a t-butyl group, an n-pentyl group, an isopentyl group, a neopentyl group, an n-hexyl group, an isohexyl group, and the like.

Examples of a substituent that may substitute the alkyl group having 1 to 6 carbon atoms represented by $A^y$ (that is substituted or unsubstituted) include those mentioned above (excluding an alkyl group having 1 to 6 carbon atoms) in connection with the substituent that may substitute the trivalent aromatic group represented by $A^1$.

Examples of the organic group having 2 to 30 carbon atoms represented by $A^y$ that includes at least one aromatic ring selected from the group consisting of an aromatic hydrocarbon ring and a heteroaromatic ring, include those mentioned above in connection with $A^x$.

The aromatic ring included in $A^y$ may be substituted with a substituent at an arbitrary position. Examples of the substituent include those mentioned above in connection with the substituent that may substitute the trivalent aromatic group represented by $A^1$.

The groups shown below are preferable as $A^x$ and $A^y$.

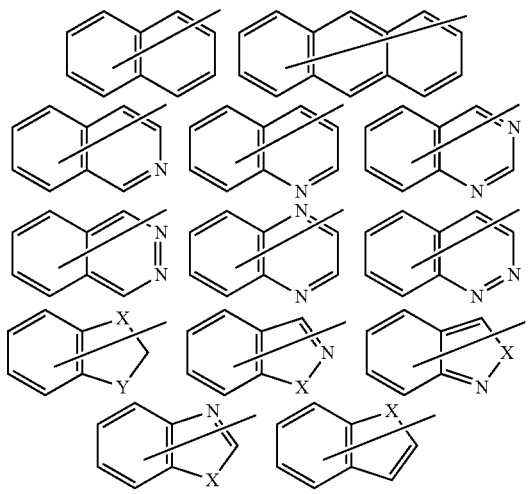

wherein X and Y are the same as defined above.

The groups shown below are more preferable as $A^x$ and $A^y$.

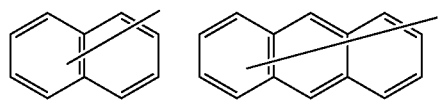

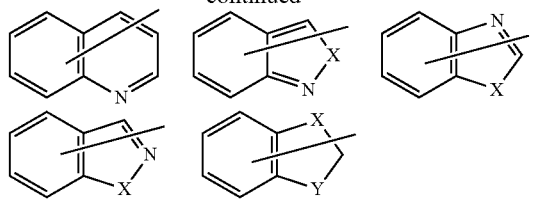

wherein X and Y are the same as defined above.

The groups shown below are particularly preferable as $A^x$ and $A^y$.

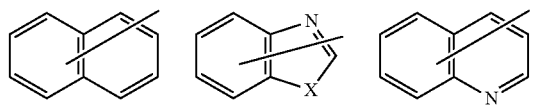

wherein X is the same as defined above.

These groups may be substituted at an arbitrary position with a substituent similar to those mentioned above in connection with the substituent that may substitute the trivalent aromatic group represented by $A^1$.

$A^x$ and $A^y$ optionally bond to each other to form a ring. The ring that is optionally formed by $A^x$ and $A^y$ may be either a monocyclic ring or a fused ring. The ring that is optionally formed by $A^x$ and $A^y$ is preferably a substituted or unsubstituted unsaturated heterocyclic ring having 4 to 30 carbon atoms, or a substituted or unsubstituted unsaturated carbocyclic ring having 6 to 30 carbon atoms.

The unsaturated heterocyclic ring having 4 to 30 carbon atoms and the unsaturated carbocyclic ring having 6 to 30 carbon atoms are not particularly limited, and may or may not have aromaticity. Examples of the unsaturated heterocyclic ring having 4 to 30 carbon atoms and the unsaturated carbocyclic ring having 6 to 30 carbon atoms are shown below.

Note that the rings shown below correspond to the above part in the formula (I).

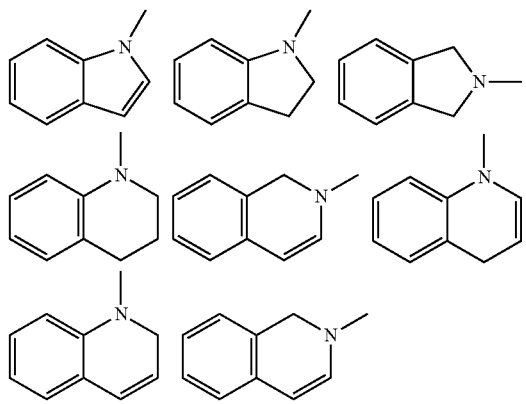

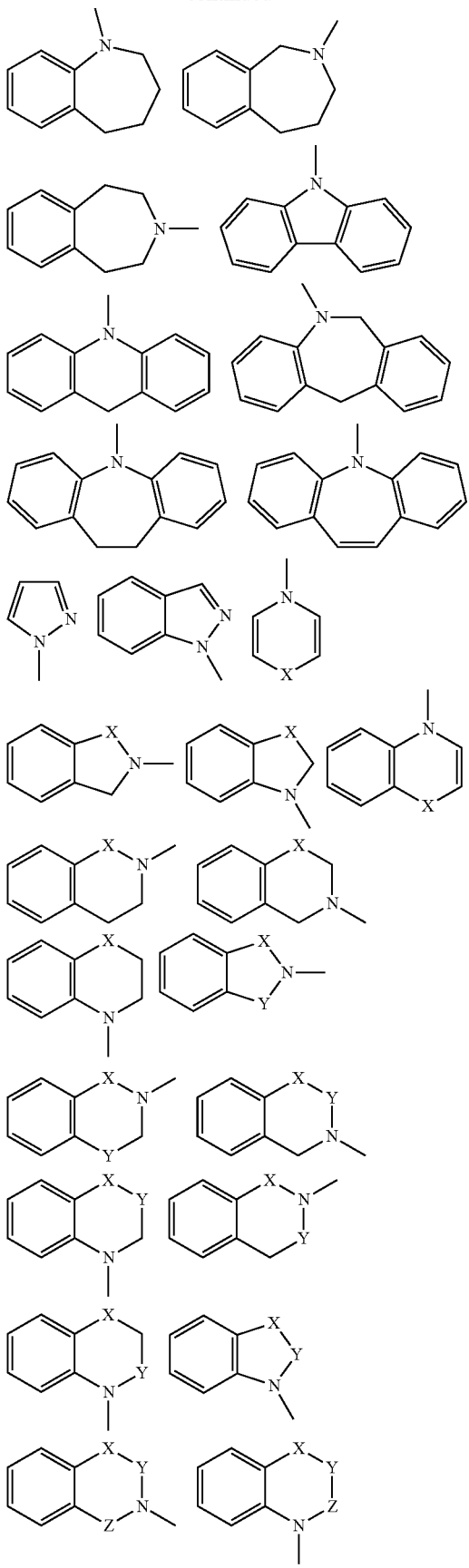
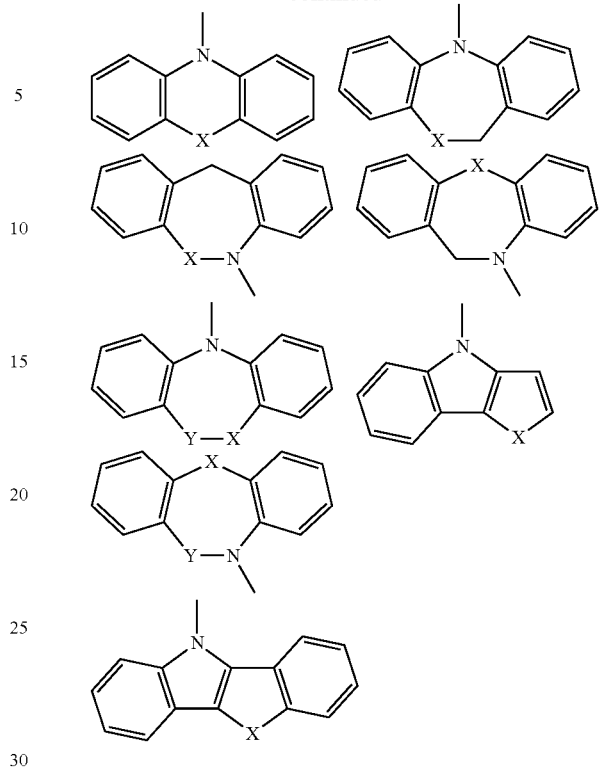

wherein X, Y, and Z are the same as defined above.

These rings may be substituted with a substituent.

Examples of the substituent include a halogen atom, a cyano group, an alkyl group having 1 to 6 carbon atoms, an alkoxy group having 1 to 6 carbon atoms, a nitro group, $-C(=O)-R^{19}$, $-C(=O)-OR^{19}$, $-SO_2R^{19}$, and the like. $R^{19}$ is an alkyl group having 1 to 6 carbon atoms, or an aryl group having 6 to 14 carbon atoms, similar to those that may be represented by $R^{16}$.

The total number of 7l electrons included in $A^x$ and $A^y$ is preferably 4 to 24, and more preferably 6 to 18, in order to ensure that the intended effects of the invention can be more advantageously achieved.

It is preferable that $A^x$ be an aromatic group having 4 to 30 carbon atoms, and $A^y$ be a hydrogen atom, a cycloalkyl group having 3 to 8 carbon atoms, or an alkyl group having 1 to 20 carbon atoms that is optionally substituted with a halogen atom, a cyano group, an alkoxy group having 1 to 6 carbon atoms, or a cycloalkyl group having 3 to 8 carbon atoms, or $A^x$ and $A^y$ bond to each other to form an unsaturated heterocyclic ring or an unsaturated carbocyclic ring.

It is more preferable that $A^x$ be a group among the groups represented by the following formulas, and $A^y$ be a hydrogen atom, a cycloalkyl group having 3 to 8 carbon atoms, or an alkyl group having 1 to 20 carbon atoms that is optionally substituted with a halogen atom, a cyano group, an alkoxy group having 1 to 6 carbon atoms, or a cycloalkyl group having 3 to 8 carbon atoms.

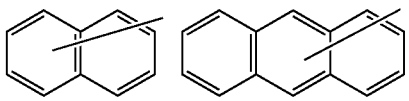

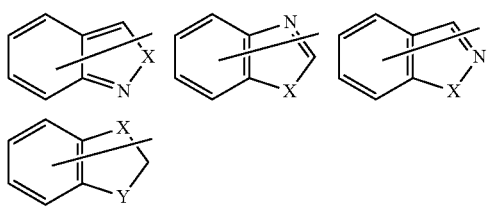

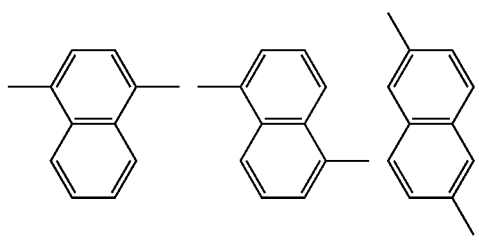

wherein X and Y are the same as defined above.

It is particularly preferable that $A^x$ be a group among the groups represented by the following formulas, and $A^y$ be a hydrogen atom, a cycloalkyl group having 3 to 8 carbon atoms, or an alkyl group having 1 to 12 carbon atoms that is optionally substituted with a halogen atom, a cyano group, an alkoxy group having 1 to 6 carbon atoms, or a cycloalkyl group having 3 to 8 carbon atoms.

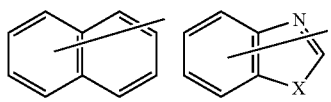

wherein X is the same as defined above.

$Q^1$ is a hydrogen atom, or a substituted or unsubstituted alkyl group having 1 to 6 carbon atoms.

Examples of the substituted or unsubstituted alkyl group having 1 to 6 carbon atoms include those mentioned above in connection with A.

$Q^1$ is preferably a hydrogen atom or an alkyl group having 1 to 6 carbon atoms, and more preferably a hydrogen atom or a methyl group.

The content of the repeating unit (I) in the copolymer according to one embodiment of the invention is 5 to 90 mol %, preferably 10 to 80 mol %, and more preferably 20 to 70 mol %, based on the total repeating units.

When the content of the repeating unit (I) in the copolymer is within the above range, a film having a reduced thickness can be easily formed using the copolymer.

Repeating Unit (II)

The copolymer according to one embodiment of the invention includes the repeating unit (II) represented by the formula (II) in its molecule in addition to the repeating unit (I).

When the copolymer includes the repeating unit (II) represented by the formula (II) in its molecule in addition to the repeating unit (I), it is possible to change the retardation of the resulting film, and adjust the thickness of the resulting film.

$Y^2$ in the formula (II) is a chemical single bond, —C(=O)—, or —O—C(=O)—. It is preferable that $Y^2$ be *—O—C(=O)— (* is a bond to $A^2$) from the viewpoint of availability, and an improvement in the advantageous effects of the invention.

$A^2$ is a substituted or unsubstituted naphthalenediyl group, or the group represented by the formula (III).

Examples of the substituted or unsubstituted naphthalenediyl group represented by $A^2$ include the groups shown below.

Examples of a substituent that may substitute the substituted or unsubstituted naphthalenediyl group represented by $A^2$ include those mentioned above in connection with the substituent that may substitute the trivalent aromatic group represented by $A^1$.

$R^1$ to $R^8$ in the formula (III) are independently a hydrogen atom, a halogen atom, or a hydrocarbon group having 1 to 6 carbon atoms.

Examples of the halogen atom that may be represented by $R^1$ to $R^8$ include a fluorine atom, a chlorine atom, a bromine atom, and the like.

Examples of the hydrocarbon group having 1 to 6 carbon atoms include an alkyl group having 1 to 6 carbon atoms, such as a methyl group, an ethyl group, an n-propyl group, an isopropyl group, an n-butyl group, an s-butyl group, a t-butyl group, an n-pentyl group, and an n-hexyl group; an alkenyl group having 2 to 6 carbon atoms, such as a vinyl group, a propenyl group, and an allyl group; an alkynyl group having 2 to 6 carbon atoms, such as an ethynyl group and a propynyl group; a cycloalkyl group having 3 to 6 carbon atoms, such as a cyclopropyl group, a cyclopentyl group, and a cyclohexyl group; an aryl group such as a phenyl group, a 1-naphthyl group, and a 2-naphthyl group; and the like.

The hydrocarbon group having 1 to 6 carbon atoms may be substituted with a substituent at an arbitrary position.

Examples of the substituent when the hydrocarbon group having 1 to 6 carbon atoms is the alkyl group having 1 to 6 carbon atoms, the alkenyl group having 2 to 6 carbon atoms, or the alkynyl group having 2 to 6 carbon atoms, include a halogen atom such as a fluorine atom, a chlorine atom, and a bromine atom; an alkoxy group having 1 to 6 carbon atoms such as a methoxy group, an ethoxy group, and an isopropoxy group; an aryl group such as a phenyl group, a 1-naphthyl group, and a 2-naphthyl group, etc.; and the like.

Examples of the substituent when the hydrocarbon group having 1 to 6 carbon atoms is the cycloalkyl group having 3 to 6 carbon atoms or the aryl group, include a halogen atom such as a fluorine atom, a chlorine atom, and a bromine atom; an alkyl group having 1 to 6 carbon atoms, such as a methyl group and an ethyl group; an alkenyl group having 2 to 6 carbon atoms, such as a vinyl group and a propenyl group; an alkynyl group having 2 to 6 carbon atoms, such as an ethynyl group and a propynyl group; a cycloalkyl group having 3 to 6 carbon atoms, such as a cyclopropyl group, a cyclopentyl group, and a cyclohexyl group; an aryl group such as a phenyl group, a 1-naphthyl group, and a 2-naphthyl group; a nitro group; and the like.

T in the formula (III) is a group among groups respectively represented by the following formulas (T-1) to (T-3).

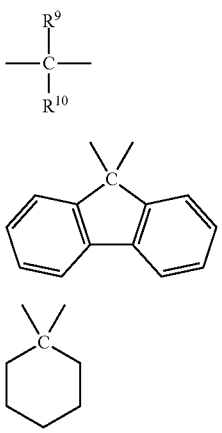

(T-1)

(T-2)

(T-3)

wherein $R^9$ and $R^{10}$ are independently a hydrogen atom, an alkyl group having 1 to 6 carbon atoms, a haloalkyl group having 1 to 6 carbon atoms, or a substituted or unsubstituted aryl group having 6 to 20 carbon atoms.

Examples of the alkyl group having 1 to 6 carbon atoms that may be represented by $R^9$ and $R^{10}$ include a methyl group, an ethyl group, an n-propyl group, an isopropyl group, an n-butyl group, a sec-butyl group, a t-butyl group, an n-pentyl group, an n-hexyl group, and the like.

Examples of the haloalkyl group having 1 to 6 carbon atoms include a fluoromethyl group, a chloromethyl group, a bromomethyl group, a difluoromethyl group, a dichloromethyl group, a dibromomethyl group, a trifluoromethyl group, a trichloromethyl group, a tribromomethyl group, a 2,2,2-trifluoroethyl group, a pentafluoroethyl group, a heptafluoropropyl group, and the like.

Examples of the aryl group having 6 to 20 carbon atoms (that is substituted or unsubstituted) include a phenyl group, a 1-naphthyl group, a 2-naphthyl group, and the like.

Examples of a substituent that may substitute the aryl group having 6 to 20 carbon atoms include a halogen atom such as a fluorine atom and a chlorine atom; an alkyl group having 1 to 6 carbon atoms, such as a methyl group and an ethyl group; an alkoxy group having 1 to 6 carbon atoms, such as a methoxy group and an ethoxy group; a nitro group; a cyano group; and the like.

It is preferable that $R^9$ and $R^{10}$ be independently an atom or a group selected from the group consisting of a hydrogen atom, a methyl group, a trifluoromethyl group, and a phenyl group.

The group represented by the formula (III) that may be included in the copolymer according to one embodiment of the invention is (i) preferably a group represented by the following formula (IIIa),

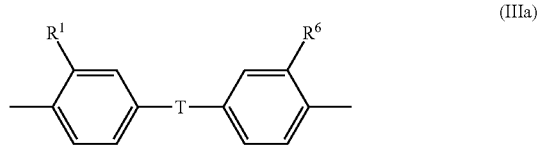

(IIIa)

wherein T, $R^1$, and $R^6$ are the same as defined above,
(ii) more preferably the group represented by the formula (IIIa) wherein T is the same as defined above, and $R^1$ and $R^6$ are independently a hydrogen atom or an alkyl group having 1 to 3 carbon atoms, and (iii) still more preferably the group represented by the formula (IIa) wherein T is the same as defined above, and $R^1$ and $R^6$ are independently a hydrogen atom or a methyl group.

The copolymer (A) according to one embodiment of the invention includes the repeating unit (I) and the repeating unit (II) in its molecule in a specific ratio. The copolymer (A) is classified into nine copolymers (A1) to (A9) (see below) that differ in structure of the repeating unit (I) and/or the repeating unit (II).

(i) Copolymer (A1)
Copolymer in which $Y^1$ included in the repeating unit (I) is —O—C(=O)—, and $Y^2$ included in the repeating unit (II) is —O—C(=O)—

(ii) Copolymer (A2)
Copolymer in which $Y^1$ included in the repeating unit (I) is —O—C(=O)—, and $Y^2$ included in the repeating unit (II) is —C(=O)—

(iii) Copolymer (A3)
Copolymer in which $Y^1$ included in the repeating unit (I) is —C(=O)—, and $Y^2$ included in the repeating unit (II) is —O—C(=O)—

(iv) Copolymer (A4)
Copolymer in which $Y^1$ included in the repeating unit (I) is —C(=O)—, and $Y^2$ included in the repeating unit (II) is —C(=O)—

(v) Copolymer (A5)
Copolymer in which $Y^1$ included in the repeating unit (I) is —O—C(=O)—, and $Y^2$ included in the repeating unit (II) is a chemical single bond (vi) Copolymer (A6)
Copolymer in which $Y^1$ included in the repeating unit (I) is a chemical single bond, and $Y^2$ included in the repeating unit (II) is —O—C(=O)—

(vii) Copolymer (A7)
Copolymer in which $Y^1$ included in the repeating unit (I) is —C(=O)—, and $Y^2$ included in the repeating unit (II) is a chemical single bond (viii) Copolymer (A8)
Copolymer in which $Y^1$ included in the repeating unit (I) is a chemical single bond, and $Y^2$ included in the repeating unit (II) is —C(=O)—

(ix) Copolymer (A9)
Copolymer in which $Y^1$ included in the repeating unit (I) is a chemical single bond, and $Y^2$ included in the repeating unit (II) is a chemical single bond Among these, the copolymer (A1) in which $Y^1$ included in the repeating unit (I) is —O—C(=O)—, and $Y^2$ included in the repeating unit (II) is —O—C(=O)—, is preferable from the viewpoint of availability and the like.

The content of the repeating unit (II) in the copolymer according to one embodiment of the invention is 10 to 95 mol %, preferably 20 to 90 mol %, and more preferably 30 to 80 mol %, based on the total repeating units.

When the content of the repeating unit (I) and the content of the repeating unit (II) are within the above ranges, it is possible to change the retardation of the resulting film, and adjust the thickness of the resulting film.

It is possible to obtain an optically anisotropic article having the desired wavelength dispersion property by appropriately adjusting the content of the repeating unit (I) and the content of the repeating unit (II) in the copolymer according to one embodiment of the invention within the above ranges.

Method for Producing Copolymer (A)

The copolymer (A1) that is preferable as the copolymer (A) according to one embodiment of the invention may be produced using the following methods, for example.

(1) Production Method 1

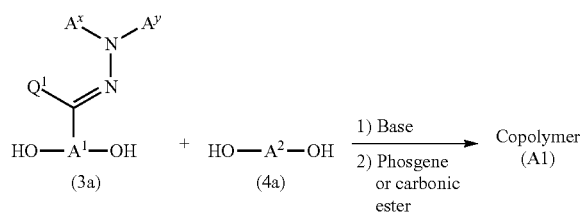

The copolymer (A1) may be produced by reacting a hydrazone compound represented by the formula (3a) (hydrazone compound (3a)), a diol compound represented by the formula (4a) (diol compound (4a)), and a phosgene or a carbonic ester in an inert solvent in the presence of a base.

Hydrazone Compound (3a)

The hydrazone compound (3a) used for the above reaction may be produced as described below, for example.

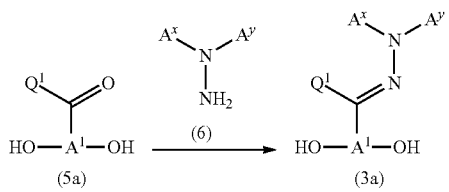

wherein $A^1$, $A^x$, $A^y$, and $Q^1$ are the same as defined above.

Specifically, a carbonyl compound represented by the formula (5a) (carbonyl compound (5a)) and a hydrazine compound represented by the formula (6) (hydrazine compound (6)) are reacted in an appropriate solvent to obtain the hydrazone compound (3a).

Most of the carbonyl compounds (5a) used for the above reaction are known compounds, and may be produced using a known method. A product commercially available as the carbonyl compound (5a) may be used after optional purification.

The hydrazine compound (6) used for the above reaction may be produced as described below.

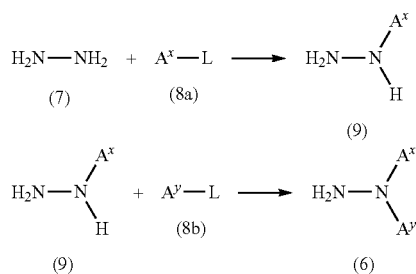

wherein $A^x$ and $A^y$ are the same as defined above, and L is a leaving group (e.g., halogen atom, methanesulfonyloxy group, or p-toluenesulfonyloxy group).

Specifically, a compound represented by the formula (8a) and a hydrazine (7) are reacted in an appropriate solvent (e.g., an alcohol-based solvent, an ether-based solvent, or a mixed solvent of an alcohol-based solvent and an ether-based solvent in a molar ratio (compound (8a):hydrazine (7)) of 1:1 to 1:20 (preferably 1:2 to 1:10) to obtain the corresponding hydrazine compound (9), and the hydrazine compound (9) and a compound represented by the formula (8b) are reacted to obtain the hydrazine compound (6).

Hydrazine monohydrate is normally used as the hydrazine (7). A commercially available product may be used directly as the hydrazine (1).

The reaction proceeds smoothly when the reaction temperature is within the range from −10° C. to the boiling point of the solvent. The reaction time is determined taking account of the reaction scale, and is normally several minutes to several hours.

The hydrazine compound (6) may also be produced by reducing a diazonium salt (10) (see below) using a known method (see JP-A-2005-336103, "Shin-Jikken Kagaku Koza", Vol. 14, Maruzen, 1978, and "Jikken Kagaku Koza", Vol. 20, Maruzen, 1992, for example).

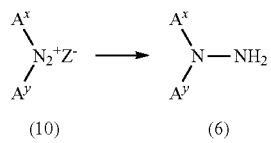

wherein $A^x$ and $A^y$ are the same as defined above, and $Z^-$ is an anion that is a counter ion for diazonium. Examples of the anion represented by $Z^-$ include an inorganic anion such as a hexafluorophosphoric acid ion, a fluoroboric acid ion, a chloride ion, and a sulfuric acid ion; an organic anion such as a polyfluoroalkylcarboxylic acid ion, a polyfluoroalkylsulfonic acid ion, a tetraphenylboric acid ion, an aromatic carboxylic acid ion, and an aromatic sulfonic acid ion; and the like.

Examples of the solvent used for the reaction include an alcohol-based solvent such as methyl alcohol, ethyl alcohol, n-propyl alcohol, isopropyl alcohol, n-butyl alcohol, isobutyl alcohol, s-butyl alcohol, t-butyl alcohol, n-pentyl alcohol, and amyl alcohol; an ether-based solvent such as diethyl ether, tetrahydrofuran, 1,2-dimethoxyethane, 1,4-dioxane, and cyclopentyl methyl ether; and the like. The solvents may be used either alone or in combination.

The solvent may be used in an appropriate amount taking account of the type of each compound, the reaction scale, and the like, but is normally used in an amount of 1 to 100 ml per gram of the hydrazine compound (6).

The carbonyl compound (5a) and the hydrazine compound (6) are normally used in a molar ratio (carbonyl compound (5a):hydrazine compound (6)) of 1:2 to 2:1, and preferably 1:1.5 to 1.5:1.

The reaction may be effected in the presence of an acid catalyst such as an organic acid (e.g., (±)-10-camphorsulfonic acid or p-toluenesulfonic acid), a salt thereof, or an inorganic acid (e.g., hydrochloric acid or sulfuric acid). The addition of the acid catalyst may reduce the reaction time, and improve the yield. The acid catalyst is normally added in an amount of 0.001 to 1 mol based on 1 mol of the carbonyl compound (5a).

The acid catalyst may be added directly, or may be added in the form of a solution prepared by dissolving the acid catalyst in an appropriate solvent.

The reaction proceeds smoothly when the reaction temperature is within the range from −10° C. to the boiling point of the solvent. The reaction time is determined taking account of the reaction scale, and is normally several minutes to several tens of hours, and preferably 30 minutes to 10 hours.

Most of the diol compounds (4a) used for the above reaction are known compounds, and may be produced using a known method. A product commercially available as the diol compound (4a) may be used after optional purification.

Diol Compound (4a)

Specific examples of the diol compound (4a) include, but are not limited to,
bis(4-hydroxyphenyl)methane, 1,1-bis(4-hydroxyphenyl)ethane,
1,2-bis(4-hydroxyphenyl)ethane, 2,2-bis(4-hydroxyphenyl)propane,
2,2-bis(3-methyl-4-hydroxyphenyl)butane, 2,2-bis(4-hydroxyphenyl)butane,
2,2-bis(4-hydroxyphenyl)octane, 4,4-bis(4-hydroxyphenyl)heptane,
1,1-bis(4-hydroxyphenyl)-1,1-diphenylmethane,
1,1-bis(4-hydroxyphenyl)-1-phenylethane, 1,1-bis(4-hydroxyphenyl)-1-phenylmethane,
1,1,1,3,3,3-hexafluoro-2,2-bis(4-hydroxyphenyl)propane, bis(4-hydroxyphenyl) ether,
bis(4-hydroxyphenyl) sulfide, bis(4-hydroxyphenyl)sulfone,
1,1-bis(4-hydroxyphenyl)cyclopentane, 1,1-bis(4-hydroxyphenyl)cyclohexane,
2,2-bis(3-methyl-4-hydroxyphenyl)propane,
2-(3-methyl-4-hydroxyphenyl)-2-(4-hydroxyphenyl)-1-phenylethane,
1,1,1,3,3,3-hexafluoro-2,2-bis(3-methyl-4-hydroxyphenyl)propane,
bis(3-methyl-4-hydroxyphenyl) sulfide, bis(3-methyl-4-hydroxyphenyl)sulfone,
bis(3-methyl-4-hydroxyphenyl)methane,
1,1-bis(3-methyl-4-hydroxyphenyl)cyclohexane,
2,2-bis(2-methyl-4-hydroxyphenyl)propane,
1,1-bis(2-butyl-4-hydroxy-5-methylphenyl)butane,
1,1-bis(2-tert-butyl-4-hydroxy-3-methylphenyl)ethane,
1,1-bis(2-tert-butyl-4-hydroxy-5-methylphenyl)propane,
1,1-bis(2-tert-butyl-4-hydroxy-5-methylphenyl)butane,
1,1-bis(2-tert-butyl-4-hydroxy-5-methylphenyl)isobutane,
1,1-bis(2-tert-butyl-4-hydroxy-5-methylphenyl)heptane,
1,1-bis(2-tert-butyl-4-hydroxy-5-methylphenyl)-1-phenylmethane,
1,1-bis(2-tert-amyl-4-hydroxy-5-methylphenyl)butane,
bis(3-chloro-4-hydroxyphenyl)methane, bis(3,5-dibromo-4-hydroxyphenyl)methane,
2,2-bis(3-chloro-4-hydroxyphenyl)propane, 2,2-bis(3-fluoro-4-hydroxyphenyl)propane,
2,2-bis(3-bromo-4-hydroxyphenyl)propane,
2,2-bis(3,5-difluoro-4-hydroxyphenyl)propane,
2,2-bis(3,5-dichloro-4-hydroxyphenyl)propane,
2,2-bis(3,5-dibromo-4-hydroxyphenyl)propane,
2,2-bis(3-bromo-4-hydroxy-5-chlorophenyl)propane,
2,2-bis(3,5-dichloro-4-hydroxyphenyl)butane,
2,2-bis(3,5-dibromo-4-hydroxyphenyl)butane,
1-phenyl-1,1-bis(3-fluoro-4-hydroxyphenyl)ethane, bis(3-fluoro-4-hydroxyphenyl) ether, 1,1-bis(3-cyclohexyl-4-hydroxyphenyl)cyclohexane, 4,4'-dihydroxybiphenyl,
4,4'-dihydroxy-3,3'-dimethylbiphenyl, 4,4'-dihydroxy-2,2'-dimethylbiphenyl,
4,4'-dihydroxy-3,3'-dicyclohexylbiphenyl, 3,3'-difluoro-4,4'-dihydroxybiphenyl,
9,9-bis(4-hydroxyphenyl)fluorene, 9,9-bis(3-methyl-4-hydroxyphenyl)fluorene, and the like. These bisphenol compounds may be used either alone or in combination.

The compounds shown below are preferable as the diol compound (4a).

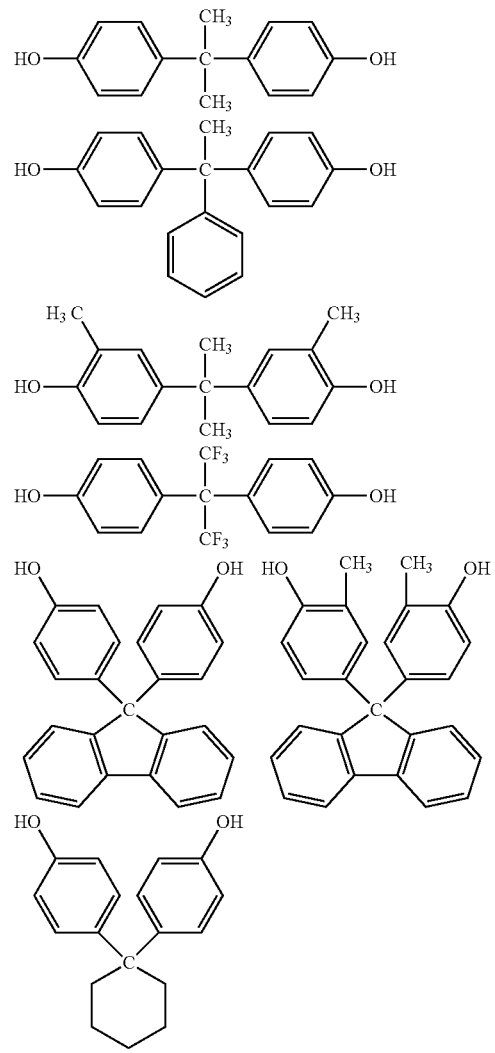

Reaction of Hydrazone Compound (3a) and Diol Compound (4a)

The hydrazone compound (3a) and the diol compound (4a) are used for the above reaction in a molar ratio (hydrazone compound (3a):diol compound (4a)) of 5:95 to 90:10.

Examples of the phosgene include phosgene, diphosgene, triphosgene, chloroformate, and the like. Examples of the carbonic ester include dimethyl carbonate, diethyl carbonate, diphenyl carbonate, and the like. When using phosgene, it is preferable to bubble an excessive amount of phosgene gas into the reaction mixture. The phosgene gas is bubbled into the reaction mixture at 0 to 50° C.

The phosgene or the carbonic ester is used in an amount of 2-fold mol or more, preferably 2 to 10-fold mol, and more preferably 2 to 5-fold mol, based on the total number of moles of the hydrazone compound (3a) and the diol compound (4a).

Examples of the base used for the above reaction include an alkali metal hydroxide such as lithium hydroxide, sodium hydroxide, and potassium hydroxide; an alkaline-earth metal hydroxide such as magnesium hydroxide and calcium hydroxide; an organic base such as triethylamine, diisopropylethylamine, and pyridine; and the like. These bases may be used either alone or in combination. Among these, an alkali metal hydroxide and an alkaline-earth metal hydroxide are preferable, and an alkali metal hydroxide is more preferable, since the target product can be obtained in high yield, for example.

The base is used in an amount of 2-fold mol or more, preferably 2 to 10-fold mol, and more preferably 2 to 5-fold mol, based on the total number of moles of the hydrazone compound (3a) and the diol compound (4a).

The solvent is not particularly limited as long as the solvent is inert to the reaction. Examples of the solvent include an aromatic hydrocarbon-based solvent such as benzene, toluene, and xylene; a saturated hydrocarbon-based solvent such as pentane, hexane, heptane, and octane; an alicyclic hydrocarbon such as cyclopentane, cyclohexane, cyclooctane, and decalin; a halogenated hydrocarbon such as methylene chloride, chloroform, carbon tetrachloride, 1,2-dichloroethane, and chlorobenzene; an ether-based solvent such as diethyl ether, 1,2-dimethoxyethane, and cyclopentyl methyl ether; water; and the like.

These solvents may be used either alone or in combination. Two types of immiscible solvents (e.g., a mixed solvent of a halogenated hydrocarbon and water) may also be used.

The solvent is used in an appropriate amount taking account of the reaction scale, but is normally used in an amount of 0.1 to 100 ml per gram of the hydrazone compound (3a). When using a mixed solvent of a halogenated hydrocarbon and water, the halogenated hydrocarbon and water are normally used in an amount of 0.1 to 100 ml per gram of the hydrazone compound (3a).

A molecular weight modifier may be added to the reaction mixture in order to adjust the degree of polymerization.

Examples of the molecular weight modifier include a monofunctional compound such as a phenol (e.g., phenol, p-t-butylphenol, and p-cumylphenol).

The reaction may be effected in the presence of a catalyst such as a tertiary amine (e.g., triethylamine) or a quaternary ammonium salt in order to promote the polycondensation reaction.

A small amount of an antioxidant such as sodium sulfite or hydrogen sulfide may also be added, as required.

It is preferable to effect the reaction as described below, for example.
(i) A solution of the diol compound (4a) and the base is prepared. After the addition of the phosgene or the carbonic ester to the solution, the mixture is stirred to obtain a solution of an oligomer that has a degree of polymerization of about 2 to 10, and includes a chloroformate group at the molecular terminal.
(ii) Separately, a solution of the hydrazone compound (3a) and the base is prepared.
(iii) The solution of the hydrazone compound (3a) and the base is mixed with the solution of the oligomer to obtain a reaction mixture including the target copolymer (A1). In this case, a molecular weight modifier may be added to the reaction mixture in order to adjust the degree of polymerization.
(iv) The target copolymer (A1) is isolated from the reaction mixture using a normal method.

The above 2-step method makes it possible to easily control the reaction, and control the molecular weight with high accuracy.

The reaction is normally effected at 0 to 150° C., and preferably 5 to 40° C. The reaction may be effected under reduced pressure, under normal pressure, or under pressure. It is preferable to effect the reaction under normal pressure, or under a pressure almost equal to the pressure inside the reaction system.

The reaction time is determined taking account of the reaction temperature and the like, but is normally 0.5 minutes to 10 hours, and preferably 1 minute to 2 hours.

(2) Production Method 2

The copolymer (A1) may also be produced by subjecting the hydrazone compound (3a), the diol compound (4a), and a bisaryl carbonate (e.g., diphenyl carbonate) to transesterification.

Examples of the reaction method include a melt polycondensation method, a solid-phase polycondensation method, and the like.

When using the melt polycondensation method, two or three monomers (hydrazone compound (3a) and diol compound (4a)) are mixed, and reacted at a high temperature under reduced pressure in a molten state.

The reaction is normally effected at 150 to 350° C., and preferably 200 to 300° C.

When using the solid-phase polycondensation method, two or three monomers are mixed, and polycondensed at a temperature equal to or less than the melting point of a polycarbonate-based polymer in a solid phase. In either case, the degree of decompression is preferably set to 1 mmHg or less in the final stage of the reaction to remove a phenol derived from the bisaryl carbonate produced by transesterification from the system.

The reaction time is determined taking account of the reaction temperature, the degree of decompression, and the like, but is normally about 1 to 4 hours. It is preferable to effect the reaction in an inert gas atmosphere (e.g., nitrogen or argon). The reaction may be effected in the presence of a molecular weight modifier, an antioxidant, and the like, as required.

After completion of the reaction, the target product is isolated by performing a post-treatment operation normally employed in synthetic organic chemistry, optionally followed by a known separation/purification operation.

The structure of the target copolymer may be identified by measurement (e.g., NMR spectrometry, IR spectrometry, or mass spectrometry), elementary analysis, or the like.

A 0.5 g/dl methylene chloride solution of the copolymer according to one embodiment of the invention has a reduced viscosity ($\eta$sp/c) at 20° C. of 0.3 to 2.0 dl/g, preferably 0.4 to 1.7 dl/g, more preferably 0.55 to 1.55 dl/g, and still more preferably 0.6 to 1.2 dl/g.

If the reduced viscosity ($\eta$sp/c) is less than 0.3 dl/g, it may be difficult to maintain mechanical strength due to fragility. If the reduced viscosity ($\eta$sp/c) exceeds 2.0 dl/g, it may be difficult to achieve purification after polymerization due to too high a solution viscosity, or a die line may occur during molding.

The reduced viscosity may be determined in accordance with JIS K 7367.

2) Optically Anisotropic Article

An optically anisotropic article according to one embodiment of the invention includes one type or two or more types of the copolymer according to one embodiment of the invention, or a mixture that includes one type or two or more types of the copolymer according to one embodiment of the invention, and an additional polymer.

Since the optically anisotropic article according to one embodiment of the invention is produced using the copolymer according to one embodiment of the invention, the optically anisotropic article achieves uniform conversion of polarized light over a wide wavelength band, and exhibits excellent optical properties.

More specifically, the optically anisotropic article according to one embodiment of the invention includes the following optically anisotropic articles (a) to (y).

(α) Optically anisotropic article that includes one type of the copolymer according to one embodiment of the invention
(β) Optically anisotropic article that includes a mixture of two or more types of the copolymer according to one embodiment of the invention
(γ) Optically anisotropic article that includes a mixture of one type or two or more types of the copolymer according to one embodiment of the invention, and an additional polymer Among these, the optically anisotropic article (α) or (β) is preferable.

It is preferable that each polymer included in the optically anisotropic article (β) or (γ) have an approximately identical refractive index since optical transparency is required.

The additional polymer (excluding the copolymer according to one embodiment of the invention) used for the optically anisotropic article (γ) is not particularly limited, but is preferably a material (particularly a thermoplastic polymer) that exhibits excellent heat resistance and good optical performance, and allows use of a solution film-forming technique.

The additional polymer may be one polymer or two or more polymers appropriately selected from a polyarylate, a polyester, a polycarbonate, a polyolefin, a polyether, a polysulfine-based copolymer, a polysulfone, a polyethersulfone, and the like. Among these, a polycarbonate is preferable.

The shape of the optically anisotropic article according to one embodiment of the invention is not particularly limited. It is preferable that the optically anisotropic article according to one embodiment of the invention be a film-like optically anisotropic article when used for optical applications or the like. Note that the term "film-like optically anisotropic article" used herein includes a sheet-like optically anisotropic article. When the optically anisotropic article according to one embodiment of the invention is a film-like optically anisotropic article, the optically anisotropic article may be a long optically anisotropic article, or may be a strip-like optically anisotropic article.

When the optically anisotropic article according to one embodiment of the invention is a film-like optically anisotropic article, the thickness of the optically anisotropic article is not particularly limited, but is normally 1 to 1000 μm.

The optically anisotropic article according to one embodiment of the invention may be produced by molding the polymer material to have the desired shape using a known molding method.

For example, a film-like optically anisotropic article may be produced using a known melt extrusion method or solution casting method (preferably a solution casting method).

When using the solution casting method, the polymer material is dissolved in an appropriate solvent to prepare a coating liquid. The coating liquid is applied to an appropriate substrate to form a film, and the film is dried, and optionally heated to obtain a film-like optically anisotropic article.

Examples of the solvent used to prepare the coating liquid include a ketone-based solvent such as acetone, methyl ethyl ketone, methyl isobutyl ketone, cyclopentanone, and cyclohexanone; an ester-based solvent such as butyl acetate and amyl acetate; a halogenated hydrocarbon-based solvent such as dichloromethane, chloroform, and dichloroethane; an ether-based solvent such as tetrahydrofuran, tetrahydropyran, 1,2-dimethoxyethane, 1,4-dioxane, cyclopentyl methyl ether, and 1,3-dioxolane; an aprotic polar solvent such as N,N-dimethylformamide, N,N-dimethylacetamide, dimethyl sulfoxide, γ-butyrolactone, and N-methylpyrrolidone; and the like. Among these, it is preferable to use a compound having a boiling point of 60 to 200° C. from the viewpoint of handling capability. These solvents may be used either alone or in combination.

A known plasticizer such as a phthalic ester (e.g., dimethyl phthalate, diethyl phthalate, or dibutyl phthalate), a phosphoric ester (e.g., tributyl phosphate), an aliphatic dibasic ester, a glycerol derivative, or a glycol derivative may be added to the coating liquid in order to improve the stretching capability when producing an oriented polymer film (described later). A UV absorber such as phenyl salicylate, 2-hydroxybenzophenone, or triphenyl phosphate, a bluing agent for changing a color, an antioxidant, and the like may also be added to the coating liquid.

The additive is preferably added in an amount of 10 wt % or less, and more preferably 3 wt % or less, based on the polymer material.

A substrate formed of a known organic or inorganic material may be used as the substrate used for the solution casting method. Examples of the organic material include a polycycloolefin (e.g., Zeonex and Zeonor (registered trademark; manufactured by Zeon Corporation); Arton (registered trademark; manufactured by JSR Corporation); and Apel (registered trademark; manufactured by Mitsui Chemicals Inc.)), polyethylene terephthalate, a polycarbonate, a polyimide, a polyamide, polymethyl methacrylate, polystyrene, polyvinyl chloride, polytetrafluoroethylene, cellulose, cellulose triacetate, polyethersulfone, and the like. Examples of the inorganic material include silicon, glass, calcite, and the like. It is preferable to use an organic material.

The substrate is preferably a substrate that is formed of an organic material, and more preferably a resin film that is formed of the organic material.

The substrate may be a single-layer substrate, or may be a laminate. The substrate may be a long substrate, or may be a strip-like substrate.

The coating liquid may be applied to the substrate using a known method. Examples of the coating method include a curtain coating method, an extrusion coating method, a roll coating method, a spin coating method, a dip coating method, a bar coating method, a spray coating method, a slide coating method, a print coating method, and the like.

The film obtained by applying the coating liquid to the substrate is normally dried at 50 to 200° C. The dimensional stability of the film-like optically anisotropic article according to one embodiment of the invention can be improved by optionally annealing the film. The heating temperature is not particularly limited, but is normally about 200 to 250° C.

The optically anisotropic article according to one embodiment of the invention is useful as a retardation film, an alignment film for a liquid crystal display device, a polarizer, a viewing angle-improving film, a color filter, a low-pass filter, an optical polarization prism, an optical filter, and the like.

3) Oriented Polymer Film

An oriented polymer film according to one embodiment of the invention is obtained by stretching the film-like optically anisotropic article (unstretched film) according to one embodiment of the invention.

The term "stretching" used herein refers to a treatment that uniaxially or biaxially stretches a polymer film at a temperature equal to or higher than the glass transition temperature (Tg) of the polymer material, but is equal to or lower than the melting point of the polymer material, thereby causing the linear polymer molecules to be oriented in the stretching direction.

When a polymer film (film-like optically anisotropic article) is stretched, the molecules included in the film are oriented in the stretching direction, and the strength (in the orientation direction), rigidity (hardness), and the impact strength of the film can be improved.

The film-like optically anisotropic article (unstretched film) according to one embodiment of the invention may be stretched using an arbitrary stretching method. The film-like optically anisotropic article (unstretched film) may be stretched using a known stretching method. It is preferable to stretch the film-like optically anisotropic article (unstretched film) using a longitudinal uniaxial stretching method.

The film-like optically anisotropic article (unstretched film) may be stretched in a state in which the organic solvent used when forming the film remains in the film. It is preferable that the organic solvent remain in the film in an amount of 1 to 20 wt % based on the solid content of the polymer.

It is preferable that the oriented polymer film according to one embodiment of the invention be transparent. It is preferable that the oriented polymer film according to one embodiment of the invention have a haze value of 3% or less and a total light transmittance of 85% or more.

The oriented polymer film according to one embodiment of the invention is useful as a retardation film, an alignment film for a liquid crystal display device, a polarizer, a viewing angle-improving film, a color filter, a low-pass filter, an optical polarization prism, an optical filter, and the like.

EXAMPLES

The invention is further described below by way of examples. Note that the invention is not limited to the following examples.

The reduced viscosity (ηsp/c) at 20° C. of a 0.5 g/dl methylene chloride solution of the copolymer was measured in accordance with JIS K 7367.

1) Synthesis of Monomer

Synthesis Example 1

Synthesis of Compound I

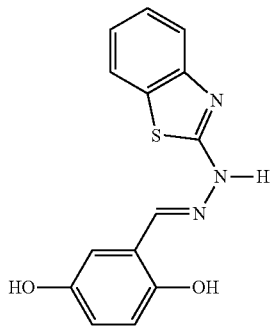

Compound I

A four-necked reactor equipped with a thermometer was charged with 56 g (0.41 mol) of 2,5-dihydroxybenzaldehyde, 69 g (0.42 mol) of 2-hydrazinobenzothiazole, and 2000 ml of methanol under a nitrogen stream to prepare a solution. The solution was refluxed for 1 hour with heating. After completion of the reaction, the reaction mixture was cooled to 20° C. to precipitate a solid, which was filtered off. The solid was washed with methanol, and dried using a vacuum dryer to obtain 106 g of a compound I as a light yellow solid (yield: 91.7%). The structure of the target product was identified by $^1$H-NMR.

The $^1$H-NMR spectrum data are shown below.

$^1$H-NMR (500 MHz, DMSO-$d_6$, TMS, δ ppm): 12.18 (s, 1H), 9.72 (s, 1H), 9.00 (s, 1H), 8.41 (s, 1H), 7.77 (d, 1H, J=7.5 Hz), 7.41 (d, 1H, J=8.0 Hz), 7.28 (ddd, 1H, J=1.0 Hz, 8.0 Hz, 8.0 Hz), 7.13-7.10 (m, 2H), 6.78 (d, 1H, J=8.5 Hz), 6.73 (d, 1H, J=3.0 Hz, 8.5 Hz)

Synthesis Example 2

Synthesis of Compound II

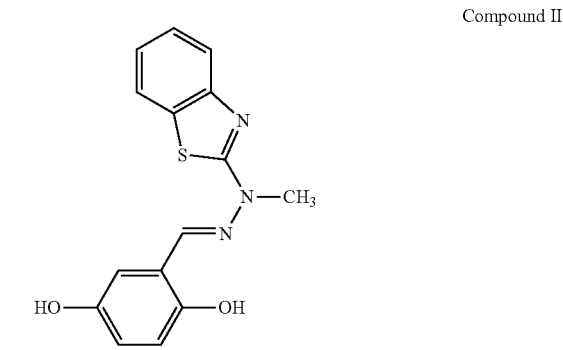 [SMILES: CN(/N=C/c1cc(O)ccc1O)c1nc2ccccc2s1]

Compound II

Step 1: Synthesis of Intermediate A

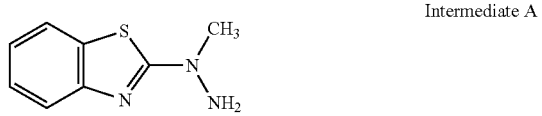

Intermediate A

A four-necked reactor equipped with a thermometer was charged with 100 g (0.61 mol) of 2-hydrazinobenzothiazole and 1000 ml of tetrahydrofuran (THF) under a nitrogen stream to prepare a solution. The solution was cooled to 0° C. 450 ml (0.73 mol) of lithium hexamethyldisilazane (26% THF solution) was slowly added dropwise to the solution. After the dropwise addition, the reaction mixture was stirred at 0° C. for 30 minutes. After the addition of 46 ml (0.73 mol) of methyl iodide, the mixture was stirred at room temperature for 3 hours. After completion of the reaction, the reaction mixture was added to 5 l of water, and extracted twice with 500 ml of ethyl acetate. The resulting ethyl acetate layer was dried over anhydrous sodium sulfate, and sodium sulfate was filtered off. Ethyl acetate was evaporated from the filtrate under reduced pressure using a rotary evaporator to obtain a yellow solid. The yellow solid was purified by silica gel column chromatography (eluant: n-hexane:ethyl acetate=70:30 (volume ratio)) to obtain 69.3 g of an intermediate A as a light yellow solid (yield: 63.9%).

The structure of the target product was identified by $^1$H-NMR.

The $^1$H-NMR spectrum data are shown below.

$^1$H-NMR (500 MHz, CDCl$_3$, TMS, δ ppm): 7.61 (dd, 1H, J=1.0 Hz, 8.0 Hz), 7.55 (dd, 1H, J=1.0 Hz, 7.5 Hz), 7.29 (ddd, 1H, J=1.0 Hz, 7.5 Hz, 8.0 Hz), 7.08 (ddd, 1H, J=1.0 Hz, 7.5 Hz, 7.5 Hz), 4.31 (s, 2H), 3.45 (s, 3H)

Step 2: Synthesis of Compound II

A four-necked reactor equipped with a thermometer was charged with 38 g (0.28 mol) of 2,5-dihydroxybenzaldehyde, 49.3 mg (0.28 mol) of the intermediate A, and 1000 ml of 1-propanol under a nitrogen stream to prepare a solution. The solution was stirred at 80° C. for 1 hour. After completion of the reaction, the reaction mixture was cooled to 20° C. to precipitate a solid, which was filtered off. The solid was washed with 1-propanol, and dried using a vacuum dryer to obtain 60.0 g of a compound II as a light yellow solid (yield: 72.7%).

The structure of the target product was identified by $^1$H-NMR.

The $^1$H-NMR spectrum data are shown below.

$^1$H-NMR (400 MHz, DMSO-$d_6$, TMS, δ ppm): 9.42 (s, 1H), 8.97 (s, 1H), 8.08 (s, 1H), 7.84 (dd, 1H, J=1.0 Hz, 8.0 Hz), 7.60 (dd, 1H, J=1.0 Hz, 8.0 Hz), 7.38 (ddd, 1H, J=1.0 Hz, 7.5 Hz, 8.0 Hz), 7.19 (d, 1H, J=3.0 Hz), 7.16 (ddd, 1H, J=1.0 Hz, 7.5 Hz, 8.0 Hz), 6.77 (d, 1H, J=9.0 Hz), 6.70 (dd, 1H, J=9.0 Hz), 3.70 (s, 3H)

2) Synthesis of Polymer

Example 1

Synthesis of Polymer (I-1)

250 ml of methylene chloride was added to a solution prepared by dissolving 74 g of 2,2-bis(4-hydroxyphenyl)propane in 550 ml of a 6% sodium hydroxide aqueous solution. Phosgene gas was bubbled into the mixture for 15 minutes at a rate of 950 ml/min while stirring and cooling the mixture. The reaction mixture was allowed to stand to effect separation to obtain a methylene chloride solution (organic layer) of an oligomer having a degree of polymerization of 2 to 4, and including a chloroformate group at the molecular terminal. After the addition of methylene chloride to the methylene chloride solution of the oligomer so that the total amount of the mixture was 450 ml, the mixture was mixed with a solution prepared by dissolving 30 g of compound I synthesized in Synthesis Example 1 in 150 ml of an 8% sodium hydroxide aqueous solution, followed by the addition of 3.0 g of p-tert-butylphenol (molecular weight modifier). After the addition of 2 ml of a 7% triethylamine aqueous solution (catalyst) while vigorously stirring the mixture, the resulting mixture was stirred at 28° C. for 1.5 hours. After completion of the reaction, the reaction product was diluted with 1 l of methylene chloride, washed twice with 1.5 l of water, washed once with 1 l of 0.01 N hydrochloric acid, and washed twice with 1 l of water. The resulting organic layer was added to methanol to effect reprecipitation to obtain a polymer (I-1).

The reduced viscosity (ηsp/c) at 20° C. of a 0.5 g/dl methylene chloride solution of the polymer (I-1) was 0.74 dl/g.

Example 2

Synthesis of Polymer (I-2)

A polymer (I-2) was synthesized in the same manner as in Example 1, except that the amount of 2,2-bis(4-hydroxyphenyl)propane was changed from 74 g to 49.1 g, and the amount of compound I was changed from 30 g to 61.4 g.

The reduced viscosity (ηsp/c) at 20° C. of a 0.5 g/dl methylene chloride solution of the polymer (I-2) was 0.76 dl/g.

Example 3

Synthesis of Polymer (I-3)

A polymer (I-3) was synthesized in the same manner as in Example 1, except that 87 g of 1,1-bis(4-hydroxyphenyl)cyclohexane was used instead of 74 g of 2,2-bis(4-hydroxyphenyl)propane.

The reduced viscosity (ηsp/c) at 20° C. of a 0.5 g/dl methylene chloride solution of the polymer (I-3) was 0.75 dl/g.

Example 4

Synthesis of Polymer (I-4)

A polymer (I-4) was synthesized in the same manner as in Example 1, except that 59 g of 2,2-bis(4-hydroxyphenyl)propane and 22.8 g of 9,9-bis(4-hydroxyphenyl)fluorene were used instead of 74 g of 2,2-bis(4-hydroxyphenyl)propane.

The reduced viscosity (ηsp/c) at 20° C. of a 0.5 g/dl methylene chloride solution of the polymer (I-4) was 0.77 dl/g.

Example 5

Synthesis of Polymer (II-1)

A polymer (II-1) was synthesized in the same manner as in Example 1, except that 31.5 g of compound II synthesized in Synthesis Example 2 was used instead of 30 g of compound I.

The reduced viscosity (ηsp/c) at 20° C. of a 0.5 g/dl methylene chloride solution of the polymer (II-1) was 0.74 dl/g.

Example 6

Synthesis of Polymer (II-2)

A polymer (II-2) was synthesized in the same manner as in Example 1, except that the amount of 2,2-bis(4-hydroxyphenyl)propane was changed from 74 g to 49.1 g, and 64.4 g of compound II was used instead of 30 g of compound I.

The reduced viscosity (ηsp/c) at 20° C. of a 0.5 g/dl methylene chloride solution of the polymer (II-2) was 0.76 dl/g.

Example 7

Synthesis of Polymer (II-3)

A polymer (II-3) was synthesized in the same manner as in Example 1, except that 87 g of 1,1-bis(4-hydroxyphenyl)cyclohexane was used instead of 74 g of 2,2-bis(4-hydroxyphenyl)propane, and 31.5 g of compound II was used instead of 30 g of compound I.

The reduced viscosity (ηsp/c) at 20° C. of a 0.5 g/dl methylene chloride solution of the polymer (II-3) was 0.75 dl/g.

Reference Example 1

250 ml of methylene chloride was mixed with a solution prepared by dissolving 74 g of 2,2-bis(4-hydroxyphenyl)propane in 550 ml of a 6% sodium hydroxide aqueous solution to prepare a mixture. Phosgene gas was bubbled into the mixture for 15 minutes at a rate of 950 ml/min while stirring and cooling the mixture. The reaction mixture was allowed to stand to effect separation to obtain a methylene chloride solution (organic layer) of an oligomer having a degree of polymerization of 2 to 4, and including a chloroformate group at the molecular terminal.

After the addition of methylene chloride to the methylene chloride solution of the oligomer so that the total amount of the mixture was 450 ml, the mixture was mixed with a solution prepared by dissolving 24 g of 2,2-bis(4-hydroxyphenyl)propane in 150 ml of an 8% sodium hydroxide aqueous solution, followed by the addition of 3.0 g of p-tert-butylphenol (molecular weight modifier). After the addition of 2 ml of a 7% triethylamine aqueous solution (catalyst) while vigorously stirring the mixture, the resulting mixture was stirred at 28° C. for 1.5 hours.

After completion of the reaction, the reaction product was diluted with 1 l of methylene chloride, washed twice with 1.5 l of water, washed once with 1 l of 0.01 N hydrochloric acid, and washed twice with 1 l of water. The organic layer was added to methanol to effect reprecipitation to obtain a polymer (P1).

The reduced viscosity (ηsp/c) at 20° C. of a 0.5 g/dl methylene chloride solution of the polymer (P1) was 0.63 dl/g.

Comparative Example 1

A reactor equipped with a stirrer, a thermometer, and a reflux condenser was charged with a sodium hydroxide aqueous solution and ion-exchanged water. After dissolving 100 g of 2,2-bis(4-hydroxyphenyl)propane and 352 g of 9,9-bis(4-hydroxy-3-methylphenyl)fluorene in the mixture, a small amount of hydrosulfite was added to the solution.

After the addition of methylene chloride, phosgene gas was bubbled into the mixture at 20° C. for about 60 minutes. After the addition of p-tert-butylphenol to effect emulsification, triethylamine was added to the mixture, and the resulting mixture was stirred at 30° C. for about 3 hours. After completion of the reaction, the reaction mixture was allowed to stand to effect separation, and the organic layer was separated. Methylene chloride was evaporated from the organic layer to obtain a polycarbonate copolymer (P2).

The compositional ratio of the resulting copolymer was almost identical with the monomer ratio.

The copolymer was dissolved in methylene chloride to prepare a dope solution having a solid content of 15 wt %. A cast film was produced using the dope solution, and uniaxially stretched (free width) at a temperature of 218° C. and a stretch ratio of 1.9 to obtain a retardation film.

3) Polymer Blending

Example 8

20 g of the polymer (I-4) obtained in Example 4 and 20 g of the polymer (P1) obtained in Reference Example 1 were dissolved in methylene chloride to prepare a solution having a solid content of 20 wt %. The solution was stirred at 25° C. for 6 hours using a small stirrer to obtain a solution of a polymer blend (I-5).

4) Production of Film

The polymers (I-1) to (I-4) and the polymers (II-1) to (II-3) were respectively dissolved in methylene chloride to prepare solutions having a solid content of 20 wt %. A cast film formed of each polymer was produced using each solution.

A cast film formed of a polymer blend was produced using the solution of the polymer blend (I-5).

5) Production of Stretched Film

Examples 9 to 16

The unstretched films respectively formed of the polymers (I-1) to (I-4), the polymers (II-1) to (II-3), and the polymer blend (I-5) were uniaxially stretched (free width) at the temperature and the stretch ratio shown in Table 1 to obtain retardation films.

Table 1 shows the polymers used in Examples 9 to 16 and Comparative Example 1, the compositional ratio of each polymer, the stretch temperature (° C.), and the stretch ratio.

The details of the diol compounds A to D shown in Table 1 are shown below.

Diol compound A: 2,2-bis(4-hydroxyphenyl)propane
Diol compound B: 1,1-bis(4-hydroxyphenyl)cyclohexane
Diol compound C: 9,9-bis(4-hydroxyphenyl)fluorene
Diol compound D: 9,9-bis(4-hydroxy-3-methylphenyl)fluorene

TABLE 1

|  | Polymer | | Compositional ratio of polymer | | | | | | Stretch temperature (° C.) | Stretch ratio |
|---|---|---|---|---|---|---|---|---|---|---|
|  |  |  | Compound I | Compound II | Diol compound A | Diol compound B | Diol compound C | Diol compound D |  |  |
| Example 9 | (I-1) |  | 25 | 0 | 75 | 0 | 0 | 0 | 200 | 1.7 |
| Example 10 | (I-2) |  | 50 | 0 | 50 | 0 | 0 | 0 | 210 | 1.6 |
| Example 11 | (I-3) |  | 25 | 0 | 0 | 75 | 0 | 0 | 200 | 1.8 |
| Example 12 | (I-4) |  | 25 | 0 | 60 | 0 | 15 | 0 | 220 | 1.6 |
| Example 13 | (II-1) |  | 0 | 25 | 75 | 0 | 0 | 0 | 220 | 1.6 |
| Example 14 | (II-2) |  | 0 | 25 | 0 | 75 | 0 | 0 | 210 | 1.6 |
| Example 15 | (II-3) |  | 0 | 25 | 0 | 75 | 0 | 0 | 200 | 1.6 |
| Example 16 | Polymer blend (I-5) | (I-4) (P1) | 25 0 | 0 0 | 60 100 | 0 0 | 15 0 | 0 0 | 200 220 | 1.6 1.6 |
| Comparative Example 1 | (P2) |  | 0 | 0 | 32 | 0 | 0 | 68 | 218 | 1.9 |

6) Annealing of Unstretched Film

The polymer (I-2) obtained in Example 2 was annealed at 220° C. for 3 hours in a nitrogen atmosphere to obtain an unstretched retardation film.

7) Measurement of Retardation

The retardation between 400 nm and 800 nm was measured using the samples obtained as described above (see "Production of stretched film" and "Annealing of unstretched film") utilizing an ellipsometer ("M2000U" manufactured by J. A. Woollam).

Evaluation of Wavelength Dispersion

The wavelength dispersion was evaluated from values α and β (calculated by the following expressions) using the measured retardation.

$$\alpha = (\text{retardation at } 449.9 \text{ nm})/(\text{retardation at } 548.5 \text{ nm})$$

$$\beta = (\text{retardation at } 650.2 \text{ nm})/(\text{retardation at } 548.5 \text{ nm})$$

The value α is smaller than 1, and the value β is larger than 1 when ideal wideband wavelength dispersion (reverse wavelength dispersion) is achieved. Table 2 shows the thickness (μm) of the polymer film, the retardation (Re) at a wavelength of 548.5 nm, and the values α and β.

TABLE 2

|  | Polymer | Stretching | Final thickness (μm) | Re (548.5 nm) | α | β |
| --- | --- | --- | --- | --- | --- | --- |
| Example 8 | (I-1) | Stretched | 70.0 | 140.54 | 0.853 | 1.038 |
| Example 9 | (I-2) | Stretched | 50.0 | 138.22 | 0.839 | 1.135 |
| Example 10 | (I-3) | Stretched | 72.0 | 135.54 | 0.915 | 1.005 |
| Example 11 | (I-4) | Stretched | 50.0 | 139.54 | 0.824 | 1.154 |
| Example 12 | (II-1) | Stretched | 70.0 | 139.45 | 0.816 | 1.011 |
| Example 13 | (II-2) | Stretched | 50.0 | 139.85 | 0.826 | 1.095 |
| Example 14 | (II-3) | Stretched | 75.0 | 134.16 | 0.927 | 1.002 |
| Example 15 | Polymer blend (I-5) | Stretched | 62.0 | 134.98 | 0.924 | 1.015 |
| Example 16 | (I-2) | Unstretched | 95.0 | 98.42 | 0.985 | 1.002 |
| Comparative Example 1 | (X) | Stretched | 100.0 | 151.00 | 0.728 | 1.105 |

As shown in Table 2, the retardation films of Examples 8 to 16 had reverse wavelength dispersion in which the value α was smaller than 1, and the value β was larger than 1.

The invention claimed is:

1. An optically anisotropic article comprising one type or two or more types of a copolymer, or a mixture that includes one type or two or more types of the copolymer, and an additional polymer,
the copolymer comprising a repeating unit (I) represented by a formula (I) and a repeating unit (II) represented by a formula (II) in its molecule,
the content of the repeating unit (I) in the copolymer being 5 to 90 mol % based on the total repeating units,
the content of the repeating unit (II) in the copolymer being 10 to 95 mol % based on the total repeating units, and
a 0.5 g/dl methylene chloride solution of the copolymer having a reduced viscosity (ηsp/c) at 20° C. of 0.3 to 2.0 dl/g,

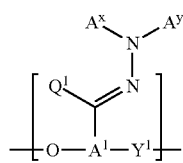
(I)

wherein $Y^1$ is a chemical single bond, —C(=O)—, or —O—C(=O)—,
$A^1$ is a substituted or unsubstituted trivalent aromatic group,
$A^x$ is an organic group having 2 to 30 carbon atoms that includes at least one aromatic ring selected from the group consisting of an aromatic hydrocarbon ring and a heteroaromatic ring,
$A^y$ is a hydrogen atom, a substituted or unsubstituted alkyl group having 1 to 6 carbon atoms, or an organic group having 2 to 30 carbon atoms that includes at least one aromatic ring selected from the group consisting of an aromatic hydrocarbon ring and a heteroaromatic ring,
provided that the aromatic ring included in A' and the aromatic ring optionally included in $A^y$ are either substituted or unsubstituted, and
$A^x$ and $A^y$ are optionally bonded to each other to form a ring, and
$Q^1$ is a hydrogen atom, or a substituted or unsubstituted alkyl group having 1 to 6 carbon atoms,

(II)

wherein $Y^2$ is a chemical single bond, —C(=O)—, or —O—C(=O)—, and
$A^2$ is a substituted or unsubstituted naphthalenediyl group, or a group represented by a formula (III):

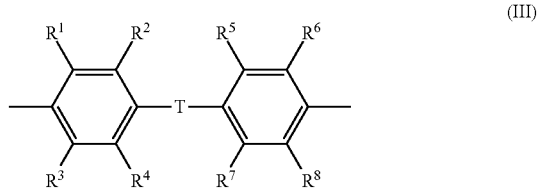
(III)

wherein $R^1$ to $R^8$ are independently a hydrogen atom, a halogen atom, or a hydrocarbon group having 1 to 6 carbon atoms, and T is a group among groups respectively represented by formulas (T-1) to (T-3):

(T-1)

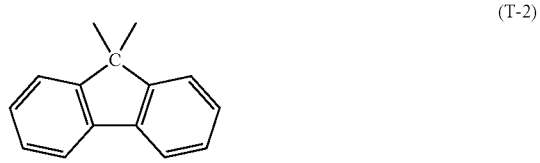
(T-2)

(T-3)

wherein $R^9$ and $R^{10}$ are independently a hydrogen atom, an alkyl group having 1 to 6 carbon atoms, a haloalkyl group having 1 to 6 carbon atoms, or a substituted or unsubstituted aryl group having 6 to 20 carbon atoms.

2. The optically anisotropic article according to claim 1, wherein $A^1$ included in the repeating unit (I) is a trivalent benzene ring group or a trivalent naphthalene ring group.

3. The optically anisotropic article according to claim 1, the optically anisotropic article being a film-like optically anisotropic article.

4. An oriented polymer film obtained by stretching the film-like optically anisotropic article according to claim 2.

5. The optically anisotropic article according to claim 2, the optically anisotropic article being a film-like optically anisotropic article.

* * * * *